March 1, 1932.  H. W. HALES  1,847,715

METHOD AND MEANS FOR MAKING COFFEE

Filed Aug. 16, 1929

INVENTOR
Henry W. Hales
BY
Ray Belmont Whitman
ATTORNEY

Patented Mar. 1, 1932

1,847,715

UNITED STATES PATENT OFFICE

HENRY W. HALES, OF RIDGEWOOD, NEW JERSEY

METHOD AND MEANS FOR MAKING COFFEE

Application filed August 16, 1929. Serial No. 386,295.

This invention relates to methods and means for making coffee, and more especially to an improved form of coffee pot or coffee percolator combining the desirable features of simplicity and economy of construction and great efficiency in use.

An object of the invention is to provide a vacuumized top or cover to a coffee pot so designed as to condense the vapor rising from below during the process of boiling the coffee and directing its return downwardly from the center of the pot to effect a percolating action thereto.

Another object is to provide an insulating cover or top over which the handle or bail of the pot is mounted to maintain the latter cool to the user's hand when in use.

A further object is to provide a utensil of this character which will give a better flavored coffee then those now in use.

Other objects are to provide a coffee pot in which the handle cannot be burned off by a hot stove but which will be kept cool and pleasant to handle at all times; a device in which no porous materials or metals are used and one in which there are no tubes, ledges or grooves to contaminate the liquid in any way, thus rendering it extremely sanitary at all times.

Figure 1:
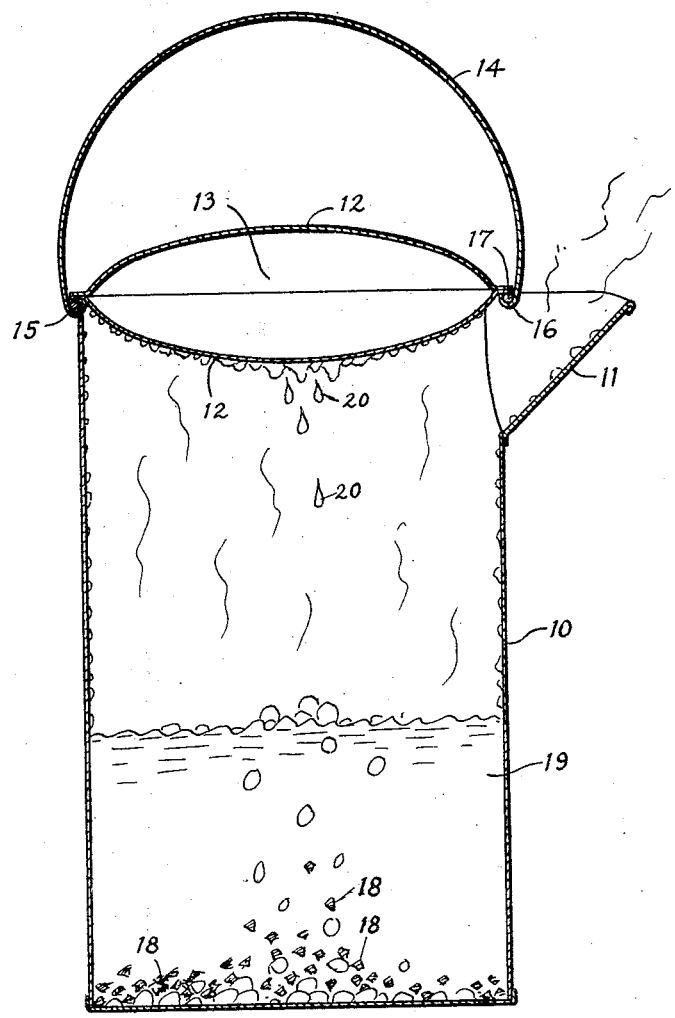

All these and other objects are attained by the methods and means now to be described, and illustrated in the accompanying drawings, in which:

Figure 1 is a vertical sectional view through a diametral plane showing the essential parts of this simplified design of coffee pot.

Figure 2:
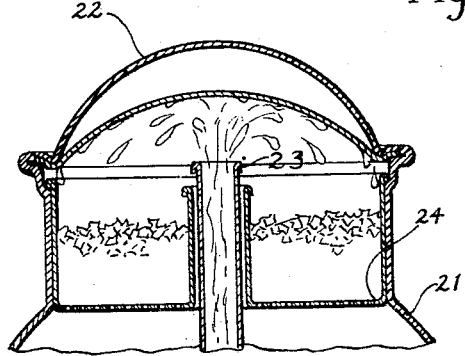

And Fig. 2 is a similar view but showing only the upper portion of the pot adapted for use as a percolator.

Like numerals refer to like parts throughout the several views.

The invention consists essentially of a cylindrical-shaped container 10, made of sheet steel or light solid metal, and having an orthodox form of pouring spout 11 fitted thereto near the top in the usual manner. The lid of the pot and which comprises an essential portion of the invention comprises two surfaces of metal 12—12, dished outwardly from each other to provide a hollow space between. These two members 12—12 are welded, brazed, or otherwise fastened together to make the space between them air-tight, and in the course of manufacture this lid is applied to a vacuum in their circumscribed space 13.

A bail or handle 14 is hinged to the coffee pot at 15 and projects over the top of the vacuumized lid and its opposite end has a hook-shaped portion 16 adapted to be resiliently held over a reinforcing ring around the top of the coffee pot 10 and which projects across the opening of the spout 11. This arrangement permits the handle to be loosened from engagement with ring 17 and to lift the lid 12 by being securely attached to it at its pivot point 15, while yet permitting its ready and instantaneous engagement over the ring portion 17 when the coffee pot is to be carried.

In operation the ground coffee 18 is put into the bottom of the pot in the usual manner and water 19 then poured in and the pot put on the stove to boil. As the steam rises from the water against the lowermost convexed surface of the vacuumized top 12, this surface being insulated by the vacuum, carries off the heat but slowly and so condenses the steam into water particles 20 which flow toward the center of the pot, drop off the surface of the top down into the liquid and thus automatically percolate the coffee by inducing a return flow down through the ground coffee, up through the liquid and vapor, and down and up again repeatedly.

The idea of the vacuumized top may also be applied to advantage in a percolator in the standard form as shown in Fig. 2, in which the container 21 carries the top 22, which is generally dished upwardly as shown, over the centrally-disposed spout-like member 23 surrounded by the coffee container member 24. In this instance the circulation is upwardly through the center and downwardly along the periphery of the top.

It has been found with this peculiar construction of handle that convection of heat is prevented in the usual manner and the vacuum cover with its absence of air produces an entirely new result as it assists in circulating the liquid quickly and tends to keep the handle cool while the liquid is hot.

It will be observed that when heat is applied below the water and steam rises until it strikes the underside of the vacuum top or cover, it there condenses and runs towards the center and drips down therefrom to the coffee grounds below, and this circulation is continued as long as heat is applied.

The handle for pouring and carrying is loosely hinged at one end and the other snaps over the rim inside the spout and the vacuum cover being firmly attached to the handle cannot fall off in pouring, or get lost or mislaid. This spring-handle construction also allows the vessel to be carried about without being held out at arms length; but instead it hangs continually at the side, adapting it to many different purposes in the household, woods, or fields. All parts of the utensil can be easily reached for cleaning and there is nothing that can contaminate or destroy the flavor of the contents in any manner.

It is to be understood that the present disclosure is for the purpose of illustration only, and that the invention is not limited thereto. To those skilled in the art, many modifications of the invention will be readily apparent, and it will also be obvious to such skilled persons that part of the methods and means may be used without other parts thereof, many such combinations of the parts readily suggesting themselves. Therefore, it should be and is to be distinctly understood that for a definition of the limitations of the invention, reference must be had to the appended claims.

Having now described the invention, what is claimed as new and for which Letters Patent of the United States is desired, is:

1. In combination, a coffee pot, a heat insulated lid hinged thereto, and a handle for carrying the pot attached to the lid and pivoting with the latter and having the end opposite the hinge removably held to the upper rim of the coffee pot.

2. The invention as in claim 1, the insulated lid comprising an air-tight hollow chamber, the contents of which have been vacuumized.

3. A coffee pot comprising a cylindrical container, a spout projecting from the upper side surface thereof, a reinforcing ring extending around the upper edge of the container and across the said spout, and a handle pivoted to the side of the container opposite to the spout, and having its other end removably held in the reinforcing ring spout portion.

4. The combination in a coffee pot of a container, a lid, and a handle for the pot, the handle and lid being pivoted to the container to move together, one end of the handle being removably attached to the container, and the lid containing a vacuum chamber for insulating said handle.

5. In combination, a coffee pot, a handle secured thereto and extending over the top thereof for lifting the pot, and a lid comprising an air tight hollow chamber the contents of which have been vacuumized, for the pot adapted to heat-insulate the handle from the pot.

6. In combination, a portable vessel adapted to hold coffee and water, a top for the vessel comprising a vacuum chamber having convexed top and bottom walls, and a handle hinged to said pot extending over said top and having one end removably engaging the pot, for lifting the same.

7. In combination, a coffee pot, a lid for the pot comprising a vacuum chamber having a convexed surface within the pot, and a handle for lifting the pot secured to said lid and to the pot and extending over said lid and having its free end adapted to removably engage said pot.

Signed at Ridgewood, in the county of Bergen and State of New Jersey, this 14th day of August, 1929.

HENRY W. HALES.